(12) United States Patent
Calderon et al.

(10) Patent No.: US 11,542,828 B2
(45) Date of Patent: Jan. 3, 2023

(54) GAS TURBINE ENGINE

(71) Applicants: ROLLS-ROYCE plc, London (GB);
ROLLS-ROYCE DEUTSCHLAND LTD & CO KG, Dahlewitz (DE)

(72) Inventors: Jorge Calderon, Berlin (DE); David Brown, Derby (GB)

(73) Assignees: ROLLS-ROYCE PLC, London (GB);
ROLLS-ROYCE DEUTSCHLAND LTD & CO KG, Dahlewitz (DE)

(*) Notice: Subject to any disclaimer, the term of this patent is extended or adjusted under 35 U.S.C. 154(b) by 49 days.

(21) Appl. No.: 17/200,235

(22) Filed: Mar. 12, 2021

(65) Prior Publication Data
US 2021/0301678 A1    Sep. 30, 2021

(30) Foreign Application Priority Data
Mar. 30, 2020    (GB) ...................... 2004586

(51) Int. Cl.
*F01D 21/06*    (2006.01)
*F01D 21/00*    (2006.01)
(Continued)

(52) U.S. Cl.
CPC .......... *F01D 21/06* (2013.01); *F01D 21/003* (2013.01); *F01D 21/006* (2013.01); *F02C 7/06* (2013.01);
(Continued)

(58) Field of Classification Search
CPC .... F01D 21/003; F01D 21/006; F01D 21/045; F01D 21/06; F02C 7/06; F02C 9/46;
(Continued)

(56) References Cited

U.S. PATENT DOCUMENTS

| | | | | |
|---|---|---|---|---|
| 3,531,934 A | * | 10/1970 | Hope-Gill | F23R 3/005 60/39.181 |
| 5,029,439 A | * | 7/1991 | Berneuil | F01D 21/045 415/123 |
| 6,494,046 B1 | | 12/2002 | Hayess | |
| 2012/0242351 A1 | * | 9/2012 | Hochreutiner | G01S 13/58 324/642 |

(Continued)

FOREIGN PATENT DOCUMENTS

| | | | | |
|---|---|---|---|---|
| EP | 3670852 A1 | | 6/2020 | |
| GB | 2 574 495 A | | 12/2019 | |
| GB | 2574495 A | * | 12/2019 | ........... F01D 21/003 |

OTHER PUBLICATIONS

Sep. 28, 2020 Search Report issues in Great Britain Patent Application No. GB2004586.0.
(Continued)

*Primary Examiner* — Loren C Edwards
(74) *Attorney, Agent, or Firm* — Oliff PLC (57) ABSTRACT

A gas turbine engine, includes: an engine core including a turbine, compressor, and shaft system connecting the turbine to the compressor, and forming a torque path therebetween. The shaft system is axially located by a thrust bearing located forward of the turbine, and the engine is configured, in the event of a shaft break which divides the shaft system into a front portion located by the thrust bearing and a rear portion unlocated by the thrust bearing, the rear portion is free to move axially rearwardly under a gas load. The engine further includes a shaft break detector having a forward speed sensor configured to measure a rotational speed of the front portion of the shaft system, and a rear microwave sensor configured to measure a rotational speed of the rear portion of the shaft system, wherein a shaft break can be detected based on differences in the measured speeds.

15 Claims, 5 Drawing Sheets

(51) Int. Cl.
*F02C 7/06* (2006.01)
*F02C 9/46* (2006.01)

(52) U.S. Cl.
CPC .......... *F02C 9/46* (2013.01); *F05D 2220/323* (2013.01); *F05D 2240/52* (2013.01); *F05D 2240/60* (2013.01); *F05D 2260/80* (2013.01); *F05D 2260/902* (2013.01); *F05D 2270/09* (2013.01); *F05D 2270/304* (2013.01)

(58) Field of Classification Search
CPC ........... F05D 2220/323; F05D 2240/52; F05D 2240/60; F05D 2260/80; F05D 2260/902; G01S 13/88
See application file for complete search history.

(56) References Cited

U.S. PATENT DOCUMENTS

| | | |
|---|---|---|
| 2013/0319092 A1 | 12/2013 | Rowe et al. |
| 2015/0176431 A1* | 6/2015 | Raykowski ............. F16C 19/52 415/9 |
| 2016/0123839 A1 | 5/2016 | Gallimore et al. |
| 2016/0194977 A1* | 7/2016 | Macdonald ............... F02C 9/46 73/112.01 |
| 2018/0016937 A1 | 1/2018 | Panzner et al. |

OTHER PUBLICATIONS

Aug. 12, 2021 Extended Search Report issued in European Patent Application No. 21161991.1.

* cited by examiner

GAS TURBINE ENGINE

CROSS-REFERENCE TO RELATED APPLICATIONS

This specification is based upon and claims the benefit of priority from UK Patent Application Number 2004586.0 filed on Mar. 30, 2020, the entire contents of which are incorporated herein by reference.

BACKGROUND

Field of the Disclosure

The disclosure relates to a gas turbine engine, and particularly a gas turbine engine for use in an aircraft.

Description of the Related Art

Modern gas turbine engines generally have up to three compressor-turbine groups, also referred to as spools, connected by respective concentric shafts. These compressor-turbine groups are responsible for the compression and expansion of air passing through the engine.

For example, the Rolls-Royce Trent 1000 ® aerospace gas turbine engine has three compressor-turbine groups: the low pressure compressor-turbine group, the intermediate pressure compressor-turbine group, and the high pressure compressor-turbine group. Each of these has a corresponding compressor and turbine. In the case of the low pressure compressor-turbine group, the low pressure compressor is generally referred to as the fan.

It is possible, during operation of the gas turbine engine, for a shaft connecting a compressor and turbine pair to mechanically fail. The breakage in the shaft leads to an instantaneous decoupling between the turbine and its respective compressor. As a result the compressor may decelerate rapidly, as it is no longer driven by the turbine, and the turbine may accelerate rapidly, as it is no longer driving the compressor.

The rapid, unmanaged acceleration of the turbine is particularly concerning, as over-speed events can lead to disintegration of the turbine, including possibly bursting of the turbine disc, and further damage to the gas turbine engine.

Also of concern on shaft break, however, is loss of axial retention of decoupled parts of a spool.

It is important then to rapidly detect a shaft break within a gas turbine engine, so that appropriate action can be taken. In particular, rapid shaft detection allows swift implementation of countermeasures that can reduce the turbines terminal speed i.e. the maximum speed reached prior to the turbine decelerating.

SUMMARY

According to a first aspect there is provided a gas turbine engine, comprising:
an engine core comprising a turbine, a compressor, and a shaft system connecting the turbine to the compressor, and forming a torque path therebetween;
wherein the shaft system is axially located by a thrust bearing located forward of the turbine, and the engine is configured such that, in the event of a shaft break which divides the shaft system into a front portion located by the thrust bearing and a rear portion unlocated by the thrust bearing, the rear portion is free to move axially rearwardly under a gas load; and
wherein the engine further comprises a shaft break detector having a forward speed sensor configured to measure a rotational speed of the front portion of the shaft system, and a rear microwave sensor configured to measure a rotational speed of the rear portion of the shaft system, wherein a shaft break can be detected based on differences in the measured speeds.

Thus shaft break failure resulting in a located rear portion can be effectively excluded. Moreover, advantageously, the engine can be configured so that, when the unlocated rear portion moves axially in the event of a shaft break, physical interaction countermeasures can come immediately into play that act to apply a braking torque on the rear portion of the shaft system. These physical interaction countermeasures should not themselves create an unsafe or hazardous situation, such as blade release or uncontainment of parts. In combination with a shaft break detection time period for the shaft break detector that is preferably less than 30 ms, and more preferably less than 20 or 10 ms, this braking torque can provide enough time for further engine control countermeasures to be taken, such as restricting fuel to the engine combustor and/or reducing air flow into the core engine, to prevent dangerous over-speeds being reached.

In a second aspect, there is provided an aircraft including the gas turbine according to the first aspect.

Optional features of the present disclosure will now be set out. These are applicable singly or in any combination with any aspect of the present disclosure.

The shaft system may be supported by one or more non-thrust bearings (e.g. roller bearings) rearwards of the thrust bearing.

Typically the thrust bearing is a ball bearing or a conical bearing.

The thrust bearing may be positioned adjacent the compressor. Advantageously, this can ensure that the majority, if not all, of a torque path of the shaft system is axially unlocated in the event of a shaft break. Related to this, the shaft system forward of the thrust bearing can be configured to have an ER (i.e. "Extremely Remote") probability of failure, ER being taken as a probability of failure in the range of $10^{-7}$ to $10^{-9}$ per Engine Flight Hour. In particular, it can be configured to have a critical part classification which meets the requirements of European Aviation Safety Agency CS-E 515.

The turbine may be a low pressure turbine, and the compressor may be a low pressure compressor. The low pressure compressor may be a fan. In this case, the shaft system may comprise a main shaft component which extends forward from the turbine, and a fan shaft component which joins to a front end of the main shaft component (e.g. via a splined joint) and connects the fan to the shaft, the thrust bearing axially locating the shaft system at the fan shaft component so that at least some, and preferably all, of the fan shaft component lies in the unlocated rear portion. This may be achieved by having the fan shaft component directly supported by the thrust bearing. However, preferably the fan shaft component is indirectly supported via a fan stubshaft which connects to (typically the front end of) the fan shaft component, the fan stubshaft being directly supported by the thrust bearing. Advantageously, the fan stubshaft is not on the torque path between the turbine and the compressor. In this way, axial location and torque transmission functions are performed by different components, i.e. the fan stubshaft and the fan shaft component respectively.

In the present disclosure, by the "shaft system" we mean generally those elements forming the torque path between the turbine and the compressor. Thus, the shaft system in the present disclosure typically comprises one or more components which, using conventional terminology, would be known as "shafts", but as well as these components, the shaft system of the present disclosure may further comprise other components such as a drive arm of the turbine (i.e. an arm extending between the above-mentioned main shaft component and the turbine). Such a drive arm also forms part of the torque path between the turbine and the compressor. In the case of a multi-stage turbine, the drive arm may include any inter-stage drive arm(s) of the multi-stage turbine.

The gas turbine engine may further comprise one or more friction decelerators which, in the event of a shaft break, engage with the turbine to apply frictional braking thereto. This can help to reduce the terminal speed of the turbine. Such decelerators are an example of an above-mentioned "physical interaction countermeasure". A friction decelerator may be located aft of the turbine, so that in the event of a shaft break the turbine is pushed into the friction decelerator by the axial movement of the rear portion of the shaft. Additionally or alternatively, a friction decelerator may be located adjacent a radially outward portion of the turbine where it can apply a relatively high braking torque on the turbine.

Additionally or alternatively, the gas turbine engine may be configured so that the axial movement of the rear portion of the shaft system produces tangling of rotors and stators of the turbine. This is another example of a "physical interaction countermeasure", and can also help to reduce the terminal speed of the turbine.

The rear microwave sensor may also be configured to act as an axial movement sensor, configured to detect axial movement of the rear portion of the shaft. This can be achieved utilising radar principles and the Doppler Effect.

Additionally or alternatively, the gas turbine engine may further comprise a separate axial movement sensor configured to register a shaft break when it detects the axial movement of the rear portion of the shaft system. The separate axial movement sensor may be a backing sensor, for example, including an electrical wire which is placed in the trajectory of the rearward movement of the part of the rear portion whose movement is to be detected. Should rearward movement occur, the electrical wire is cut and therefore an electrical connection formed by it is broken to indicate that rearward movement has occurred.

Preferably the rear microwave sensor and the forward speed sensor are positioned so that as much as possible of the torque path formed by the shaft system lies between the measurement points of the sensors. Thus the rear microwave sensor may be positioned adjacent the turbine to measure a rotational speed of the turbine. Moreover, when the turbine is a multi-stage turbine, the rear microwave sensor may be positioned adjacent the stage of the turbine which is the first turbine stage on the torque path from the turbine to measure a rotational speed of that turbine stage. Similarly, the forward speed sensor may be positioned so that it measures a rotational speed of the located front portion. For example, when the shaft system comprises a fan shaft component, the forward speed sensor may be positioned adjacent the fan shaft component to measure a rotational speed of that component, or the forward speed sensor may be positioned adjacent a fan stubshaft to measure a rotational speed of that stubshaft.

The forward speed sensor may be based on a phonic wheel and an axially aligned reluctance probe. However, another option is for the forward speed sensor to be a further microwave sensor. Advantageously such a further microwave sensor may be positioned adjacent the fan to measure a rotational speed of the fan or a fan disc. In this way, the protected torque path can be extended to the fan disc.

The gas turbine engine may further comprise an electronic engine controller, which receives the measured rotational speeds from the forward speed sensor and the rear microwave sensor, and which is configured to detect a shaft break based on differences in the measured speeds, e.g. by comparing the differences with a threshold. For example, the controller may convert a difference in measured speeds into an amount of shaft twist, which it then compares to threshold shaft twist. When a shaft break is detected, the electronic engine controller may be further configured to take above-mentioned engine control countermeasures, such as restricting fuel to the engine combustor and/or reducing air flow into the core engine (e.g. by opening handling bleed valves, closing variable stator vanes to restrict compressor inlet area and/or inducing surge by rescheduling the variable stator vanes).

When the rear microwave sensor is configured to act as a backing sensor, a shaft break may be registered as a binary signal by the sensor, which is then sent to controller, or the controller may interpret the detected axial movement (e.g. by comparison to a threshold) as a shaft break. Utilising both a difference in measured speeds and detection of axial movement to signify a shaft break can reduce the incidence of false positives.

As noted elsewhere herein, the present disclosure relates to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Examples of the disclosure will now be described by way of example with reference to the accompanying drawings in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
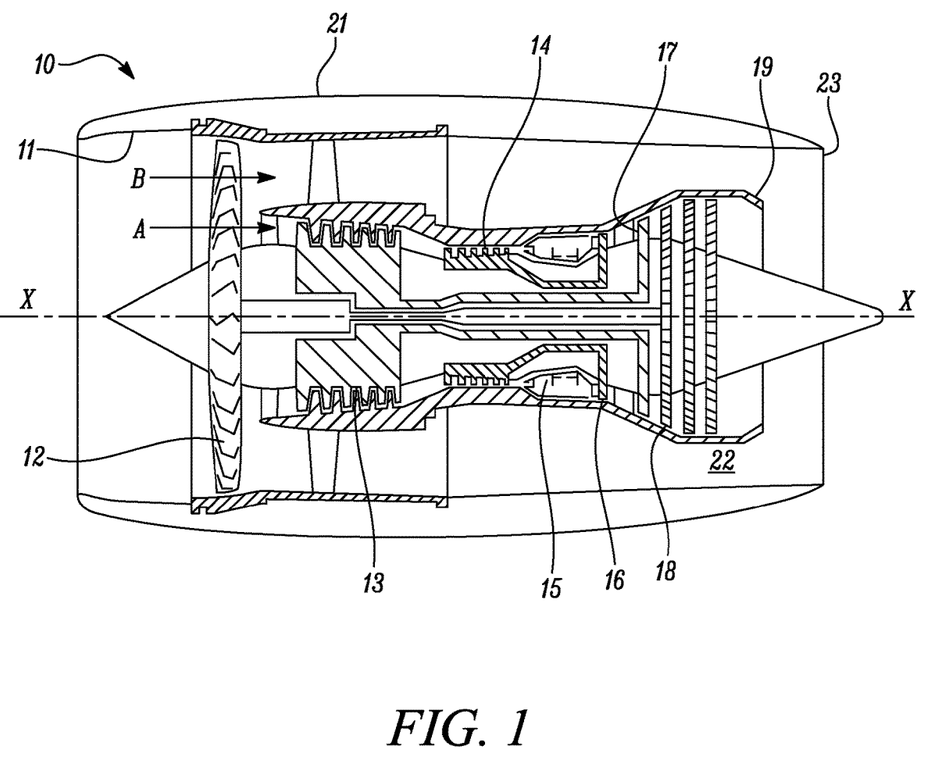
FIG. 1 shows a longitudinal cross-section through a ducted fan gas turbine engine.

With reference to FIG. 1, a ducted fan gas turbine engine is generally indicated at 10 and has a principal and rotational axis X-X. The engine comprises, in axial flow series, an air intake 11, a propulsive fan 12, an intermediate-pressure (IP) compressor 13, a high-pressure (HP) compressor 14, combustion equipment 15, an HP turbine 16, an IP turbine 17, an LP turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the IP compressor 13 and a second air flow B which passes through the bypass duct 22 to provide propulsive thrust. The IP compressor 13 compresses the air flow A directed into it before delivering that air to the HP compressor 14 where further compression takes place.

The compressed air exhausted from the HP compressor 14 is directed into the combustion equipment 15 where it is mixed with fuel and the mixture combusted. The resultant hot combustion products then expand through, and thereby drive the HP, IP and LP turbines 16, 17, 18 before being exhausted through the nozzle 19 to provide additional propulsive thrust. The HP, IP and LP-pressure turbines respectively drive the HP and IP compressors 14, 13 and the fan 12 by suitable interconnecting shafts.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
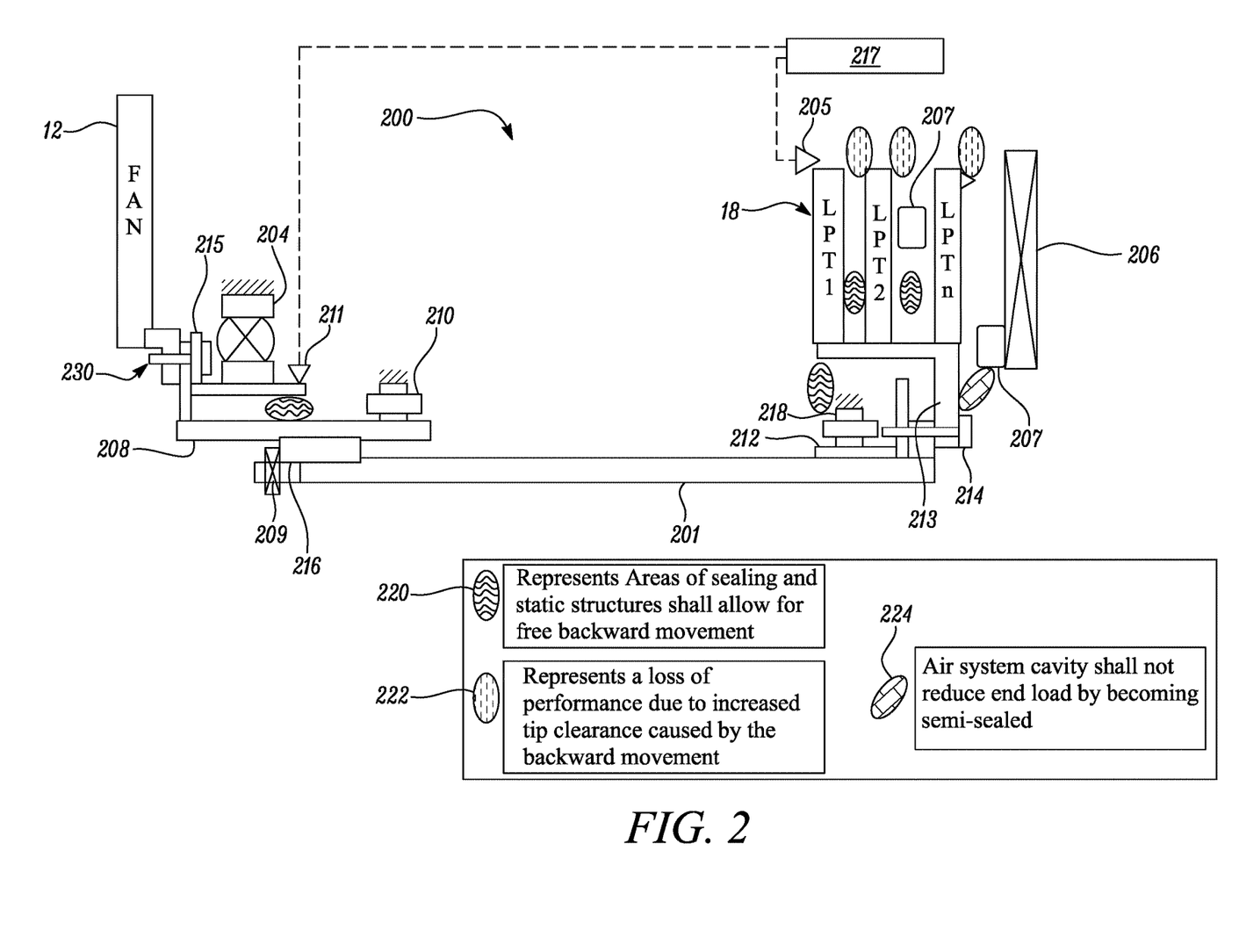
FIG. 2 is a schematic longitudinal cross-sectional view of a low pressure spool a gas turbine engine.

FIG. 2 is a schematic longitudinal cross-sectional view of the LP spool 200 of the gas turbine engine 10, the spool comprising the fan 12, the LP turbine 18 and their interconnecting shaft system. The LP turbine in this example has several stages, the rotors of which are designated LPT1, LPT2 . . . LPTn.

The shaft system of the LP spool 200 comprises a main shaft component 201 and a fan shaft component 208. The main shaft component extends forward from the LP turbine 18 to join to the fan shaft component via an oversized spline 216 or self-winding locking nut 209. Thus functionally, the main and fan shaft components form a single shaft. The use of an oversized spline and appropriate design that avoid threats of fire and oil starvation can allow the spline connection to achieve a probability of failure which is ER. Alternatively or additionally, a self-winding locking nut may be used in the case of an axial backward load on the spool. Therefore, if the shaft system fails, the backward axial force will unwind the nut and release the shaft system rearwards.

The shaft system 200 further comprises an LP turbine drive arm 213 which connects the last stage LPTn of the LP turbine 18 to the main shaft component 201 via an LP turbine stubshaft 212 and bolt arrangement 214. The bolt arrangement is configured to promote an unlocated failure of the drive arm in the event of bolt failure.

The LP shaft system is supported by three bearings: a thrust bearing 204, in this example a ball bearing, which also axially locates the shaft system; a first roller bearing 210; and a second roller bearing 218. A fan stubshaft 215, also functioning as a fan retention shaft to retain the fan 12 in the event of failure of the fan shaft component 208, is fastened to the front end of the fan shaft component at a bolted, triple flange arrangement 230 which joins the fan, the fan shaft component 208 and the fan stubshaft 215. The fan stubshaft provides a mounting position for the thrust bearing 204 adjacent to and behind the fan 12. The fan stubshaft is designed to a probability of failure of ER and is radially separated from the fan shaft component to allow unlocated failures and avoid common threats. The first roller bearing is mounted to the rear of the fan shaft component. The second roller bearing 218 is mounted to the main shaft component 201 adjacent to the low pressure turbine drive arm 213. Positioning the thrust bearing 204 on the fan stubshaft 215 means that in the event of a shaft failure (notably in the fan shaft component 208) the fan 12 will still be retained by the fan stubshaft.

A forward speed sensor 211 measures the rotational speed of the LP spool. This detector can be based on a phonic wheel and an axially aligned reluctance probe. In the example shown, the speed sensor is adjacent to the thrust bearing 204 on the fan stubshaft 215 and measures the rotational speed of the fan stubshaft. In this way, in the event of a shaft failure (and hence an unlocated failure) a reliable speed measurement of the fan can still be obtained as the fan stubshaft is isolated from such a failure and the phonic wheel and the reluctance probe thus remain in axial alignment. If the speed sensor had been provided on the fan shaft component 208 or the main shaft component 201, an unlocated failure could have resulted in loss of the axial alignment, and hence loss of the speed measurement.

The shaft system 200 further comprises a microwave sensor 205, which acts as a rear speed sensor. This is a microwave transmission and reception device which uses principles similar to those of radar to detect perturbations in the microwave electromagnetic field. The sensor can be positioned so as to point towards the blades of a turbine stage and can discern the presence of blades as they rotate or pass by the sensor, and in this way detect the presence of blades in front of the sensor. The number of blades passing per interval of time can be counted, and so the rotational speed of the turbine stage inferred. The rotational speeds measured by the forward speed sensor 211 and the microwave sensor 205 can be used, as discussed below, to detect a shaft break if it occurs.

The microwave sensor 205 is located to measure the rotational speed of the first turbine stage LPT1. With the LP turbine drive arm 213 connecting to the last stage LPTn of the LP turbine 18, the first turbine stage LPT1 is the first stage on the torque path from the main shaft component 201, through the LP turbine drive arm 213 and then the interstage drive arms of the LP turbine 18.

As a result of the spool 200 being axially located by just the thrust bearing 204 at a position adjacent the fan 12, in the event of a shaft break, the shaft system divides into a front portion located by the thrust bearing and an unlocated rear portion. Being decoupled from the fan and thereby losing its load, the LP turbine 18 starts to accelerate rapidly, possibly leading to a dangerous over-speed event. At the same time the fan starts to decelerate. The forward speed sensor 211 and the microwave sensor 205 together form a shaft break detector which can detect this relative acceleration of the LP turbine. By positioning the microwave sensor on the first stage on the torque path, a failure of the turbine drive arm 213 or an interstage drive arm thereof can also be detected.

More particularly, the speeds detected by the forward speed sensor and the microwave sensor are provides to an electronic engine controller (EEC) 217 of the engine. If the shaft system 201 breaks at any point on the torque path from the fan shaft component 208 to the interstage drive arm between the first LPT1 and second LPT2 turbine stages, the EEC will detect that a difference in the measured speeds (e.g. converted into an amount of shaft twist) exceeds a threshold, and can then register this event and prompt countermeasures to mitigate the risk of further damage to the engine. For example EEC may restrict the fuel to the combustor and/or may reduce the amount of the first air flow A e.g. via adjustment of handling bleed valves. Alternatively, one or more variable stator vanes can be adjusted to reduce the frontal area for air flow A.

Should such a break occur in the shaft system, the unlocated rear portion of the shaft system also moves axially. Thus the spool 200 includes two friction decelerators 207. In this example, one decelerator is located between stages of the LP turbine 18, and the other is located adjacent to a static structure 206 of the engine axially in line with the LP turbine drive arm 213. In the event of a shaft break, respective portions of the LP turbine 18 move axially into contact with the friction decelerators. This can help mitigate the risk of an over-speed event in which there is substantial risk of mechanical failure of the turbine, for example by reducing the runaway acceleration and terminal speed of the turbine. The decelerator located between stages of the LP turbine is at a relatively high radius from the engine centre line. In such a position it can advantageously generate a relatively high braking torque on the turbine.

However, due to an improved detection time period for shaft break and the optional inclusion of one or more friction decelerators, the terminal speed of the LP turbine 18 can be reduced. Alternatively, the reduced terminal speed can be traded for a lighter turbine, to save weight.

Additionally or alternatively to increasing the friction, the axial movement can cause controlled tangling of the rotors and stators of the turbine 18. Such tangling can further reduce the terminal speed. Compared to frictional deceleration, tangling has an added benefit in that it causes damage to the turbine blades such that they lose efficiency, reducing the amount of energy remaining in the core of the engine that can be transformed into rotational energy of the turbine.

The microwave sensor 205 can be used as an axial movement sensor to detect the rearward axial displacement of the unlocated rear portion of the shaft system. In particular, the microwave sensor can utilises radar principles and the Doppler Effect to detect this axial displacement at its turbine stage. The sensor can thus register a shaft break, which it then provides to the EEC 217. The EEC, in response to receiving the signal, can then take appropriate action to mitigate the risk of further damage to the engine as discussed above.

Indeed, although not shown in FIG. 2, the engine may have a separate backing sensor, for example based on an electrical wire (which may be wrapped with brittle ceramic material). This can be is placed in the trajectory of the rearward movement of the part of the rear portion whose movement is to be detected. For example, it can be attached to the static structure 206. Should rearward movement occur, the turbine 18 cuts the electrical wire and therefore the connection formed by it is broken. This loss of conductivity or connection signals the activation of the sensor, and therefore indicates that rearward movement has occurred.

In FIG. 2, areas 220 are demarked to represent regions of sealing and static structures which allow for free backward movement of the unlocated rear portion of the shaft. For example the region between the fan shaft component 208 and the fan stubshaft 215 is sealed but allows free backward movement such that there is no physical interference between components in this region. Regions 222 represent a loss of performance due to an increase of tip clearance in the turbine 18 on backward movement thereof. This performance loss also helps to reduce the terminal speed. For example, such an increase in tip clearance can be created by configuring the outer surface of the working gas annulus so that it expands radially outwards with rearwards distance through the turbine. Regions 222 can be seen, for example, at the radially outmost points of each rotor stage LPT1, LPT2 ... LPTn. Finally, regions 224 prevent the air system cavity from becoming semi-sealed in the event of a shaft break. Such semi-sealing could potentially restrict rearward movement of the rear portion of the shaft and hence decrease the benefit of the physical interaction countermeasures.

Figure 3:
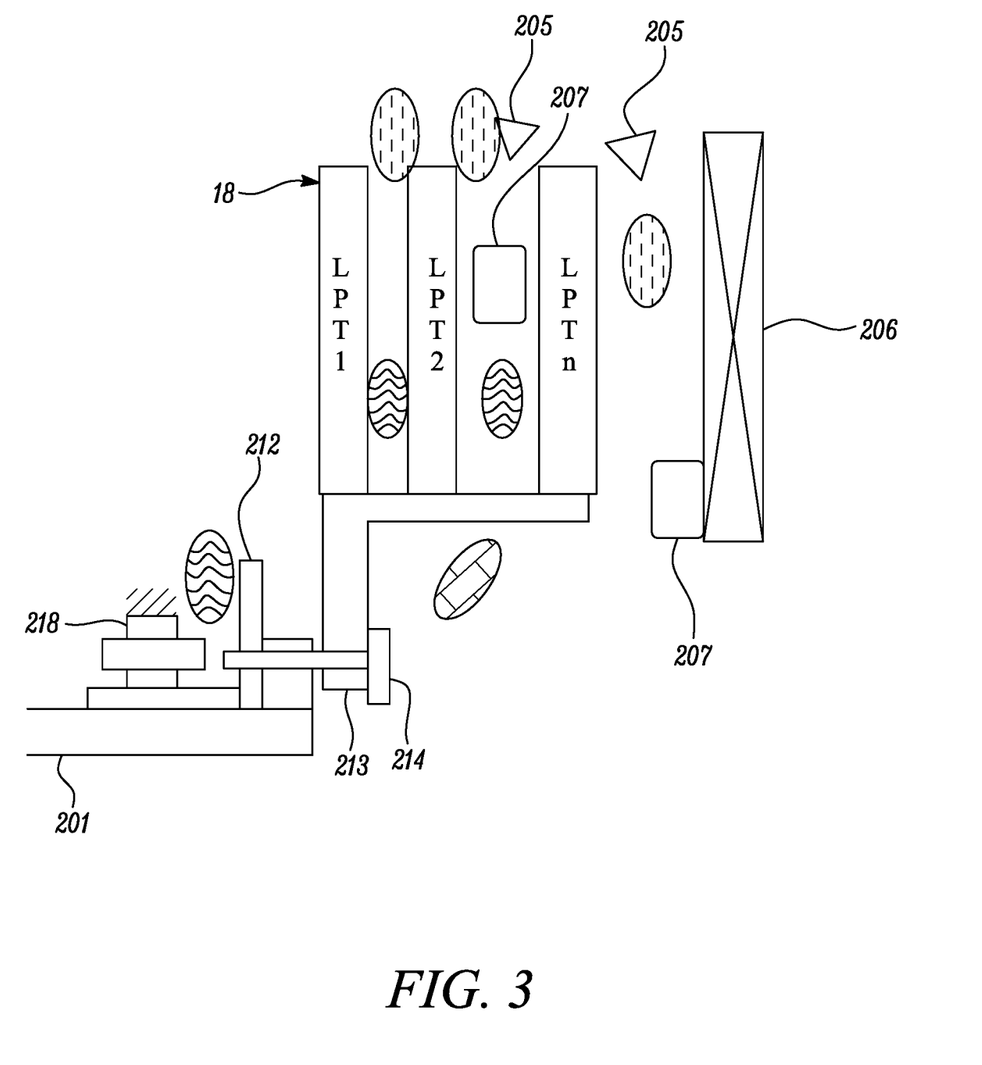
FIG. 3 is a schematic longitudinal cross-sectional view of the turbine end of a variant of the low pressure spool.

FIG. 3 is a schematic longitudinal cross-sectional view of the turbine end of a variant of the low pressure spool. In this variant the LP turbine drive arm 213 connects the first stage LPT1 of the LP turbine to the main shaft component 201 via the LP turbine stubshaft 212 and bolt arrangement 214. The final stage LPTn of the LP turbine thus becomes the first stage on the torque path from the main shaft component 201. Accordingly, the microwave sensor 205 is relocated to measure the rotational speed of the final turbine stage LPTn, either from a position in front of the final turbine stage or from a position behind that stage. Indeed two such sensors can be provided in both positions.

Figure 4:
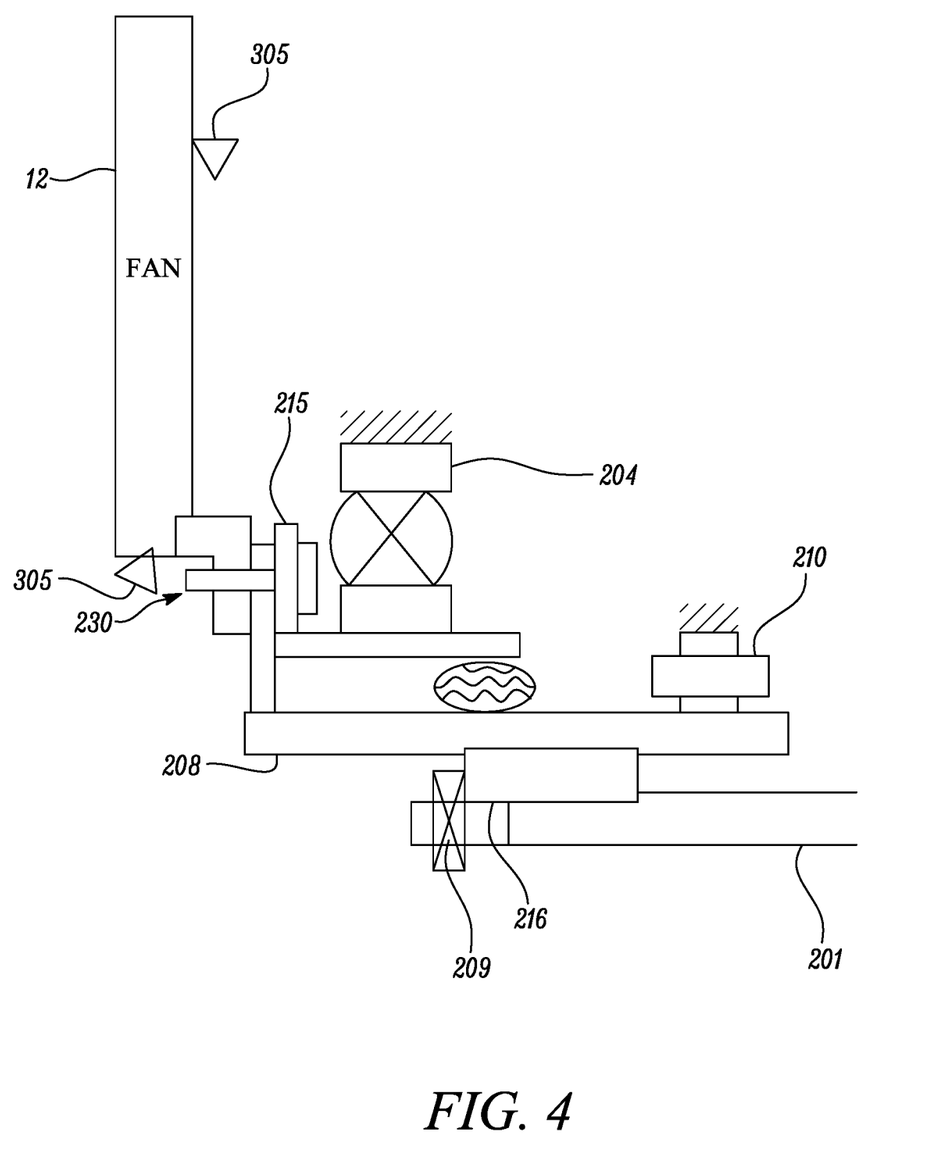
FIG. 4 is a schematic longitudinal cross-sectional view of the fan end of another variant of the low pressure.

FIG. 4 is a schematic longitudinal cross-sectional view of the fan end of another variant of the low pressure spool. In this variant, the forward speed sensor 211 is a forward microwave sensor 305 which detects the rotational speed of the fan 12. The speed signal from the forward microwave sensor is utilised by the EEC 217, in combination with the signal from the rear microwave sensor 205, in the same way to detect when a difference in the measured speeds (e.g. converted into a shaft twist) exceeds a threshold.

The forward microwave sensor 305 can be located to sense the passing of the fan blades, or it can be detect phonic wheel type features on the fan disc or roots of the fan blades held by the disc. Both options are shown in FIG. 4. Advantageously, this variant extends the protected torque path to the fan disc.

Figure 5:
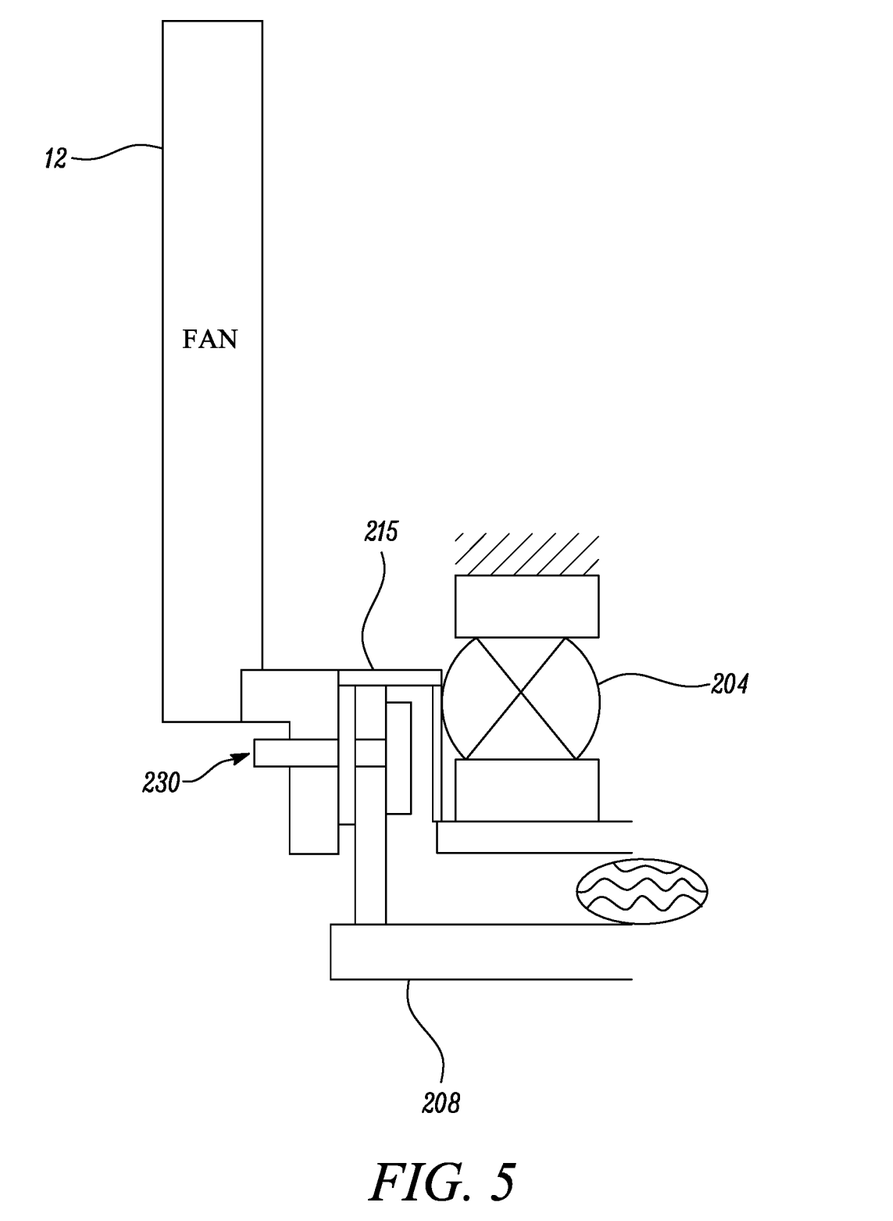
FIG. 5 is a schematic longitudinal cross-sectional view of the fan end of another variant of the low pressure spool.

FIG. 5 is a schematic longitudinal cross-sectional view of the fan end of another variant of the low pressure spool. In this variant, the triple flange arrangement 230 is modified so that the flange of the fan stubshaft 215 becomes the central flange sandwiched between the flanges of the fan 12 and the fan shaft component 208, rather than the flange of the fan shaft component 208 being the central flange. This modified arrangement places less reliance on maintenance of the integrity of the triple flange arrangement to retain the fan in the event of failure of the fan shaft component.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A gas turbine engine comprising:
an engine core comprising a turbine, a compressor, and a shaft system connecting the turbine to the compressor, and forming a torque path therebetween wherein:
the shaft system is axially located by a thrust bearing located forward of the turbine, the gas turbine engine being configured such that, in an event of a shaft break which divides the shaft system into a front portion located by the thrust bearing and a rear portion not located by the thrust bearing, the rear portion is free to move axially rearwardly under a gas load,
the gas turbine engine further comprises a shaft break detector having a forward speed sensor configured to measure a rotational speed of the front portion of the shaft system, and a rear microwave sensor configured to measure a rotational speed and an axial movement of the rear portion of the shaft system, and
a shaft break can be detected based on differences in the rotational speed measured by the forward speed sensor and the rotational speed measured by the rear microwave sensor, and based on the axial movement measured by the rear microwave sensor.

2. The gas turbine engine of claim 1, wherein the shaft system is supported by one or more non-thrust bearings rearwards of the thrust bearing.

3. The gas turbine engine of claim 1, wherein the thrust bearing is positioned adjacent the compressor.

4. The gas turbine engine of claim 1, wherein the turbine is a low pressure turbine, and the compressor is a low pressure compressor.

5. The gas turbine engine of claim 4, wherein the low pressure compressor is a fan.

6. The gas turbine engine of claim 5, wherein the shaft system comprises a main shaft component which extends forward from the turbine, and a fan shaft component which joins to a front end of the main shaft component and connects the fan to the shaft system, the thrust bearing axially locating the shaft system at the fan shaft component.

7. The gas turbine engine of claim 1, further comprising one or more friction decelerators which, in the event of the shaft break, engage with the turbine to apply frictional braking thereto.

8. The gas turbine engine of claim 1, wherein the axial movement of the rear portion of the shaft system produces tangling of rotors and stators of the turbine.

9. The gas turbine engine of claim 1, wherein the rear microwave sensor is positioned adjacent the turbine to measure the rotational speed of the turbine.

10. The gas turbine engine of claim 9, wherein the turbine is a multi-stage turbine, and the rear microwave sensor is positioned adjacent a stage of the turbine which is a first turbine stage on the torque path from the turbine to measure the rotational speed of the first turbine stage.

11. The gas turbine engine of claim 1, wherein the forward speed sensor is a further microwave sensor.

12. The gas turbine engine of claim 11, wherein the further microwave sensor is positioned adjacent a fan to measure a rotational speed of the fan.

13. The gas turbine engine of claim 1, further comprising an electronic engine controller which receives the rotational speed measured by the forward speed sensor and the rotational speed measured by the rear microwave sensor, and is configured to detect a shaft break based on differences in the rotational speed measured by the forward speed sensor and the rotational speed measured by the rear microwave sensor.

14. The gas turbine engine of claim 13, wherein the electronic engine controller is further configured to restrict a flow of fuel to the gas turbine engine when a shaft break is detected.

15. An aircraft, including the gas turbine engine of claim 1.

* * * * *